(12) United States Patent
Miranda

(10) Patent No.: US 8,624,422 B2
(45) Date of Patent: Jan. 7, 2014

(54) METHOD OF CONTROLLING A VARIABLE SPEED WIND TURBINE

(75) Inventor: Erik Carl Lehnskov Miranda, Randers (DK)

(73) Assignee: Vestas Wind Systems A/S, Aarhus N. (DK)

( * ) Notice: Subject to any disclaimer, the term of this patent is extended or adjusted under 35 U.S.C. 154(b) by 9 days.

(21) Appl. No.: 13/003,773

(22) PCT Filed: Jul. 7, 2009

(86) PCT No.: PCT/IB2009/052951
§ 371 (c)(1),
(2), (4) Date: Feb. 18, 2011

(87) PCT Pub. No.: WO2010/010477
PCT Pub. Date: Jan. 28, 2010

(65) Prior Publication Data
US 2011/0140433 A1  Jun. 16, 2011

Related U.S. Application Data

(60) Provisional application No. 61/135,753, filed on Jul. 22, 2008.

(30) Foreign Application Priority Data

Jul. 22, 2008  (DK) ................................ 2008 01032

(51) Int. Cl.
*F03D 9/00* (2006.01)
*H02P 9/04* (2006.01)

(52) U.S. Cl.
USPC ............................................. 290/55; 290/44

(58) Field of Classification Search
USPC ........................................ 290/44, 55
See application file for complete search history.

(56) References Cited

U.S. PATENT DOCUMENTS

| 5,083,039 | A | 1/1992 | Richardson et al. | |
| 5,798,631 | A * | 8/1998 | Spee et al. | 322/25 |
| 6,566,764 | B2 * | 5/2003 | Rebsdorf et al. | 290/44 |
| 7,605,487 | B2 * | 10/2009 | Barton et al. | 290/44 |
| 2008/0018309 | A1* | 1/2008 | Erdman et al. | 322/20 |
| 2008/0106099 | A1* | 5/2008 | Ichinose et al. | 290/44 |
| 2009/0160187 | A1* | 6/2009 | Scholte-Wassink | 290/44 |

OTHER PUBLICATIONS

Fernandez et al., "Comparative study on the performance of control systems for doubly fed induction generator (DFIG) wind turbines operating with power regulation", Energy 33 (2009) 1438-1452.

(Continued)

*Primary Examiner* — Julio Cesar Gonzalez
(74) *Attorney, Agent, or Firm* — Patterson & Sheridan, LLP

(57) ABSTRACT

In a method of controlling a variable speed wind turbine, said wind turbine comprising a double-fed asynchronous generator having rotor windings and stator windings and means for controlling the wind turbine speed, the method comprises the following steps:—measuring or calculating, based on measured parameters, the active electrical power ($P_r$) in the rotor windings, comparing the active electrical power ($P_r$) in the rotor windings with a preset limit ($P_r$Limit), when the active electrical power ($P_r$) in the rotor windings exceeds the preset limit ($P_r$Limit), controlling the wind turbine speed to minimize the difference between the active electrical power (Pr) in the rotor windings and a preset reference ($P_r$Ref). The rotor power ($P_r$) is kept at a reduced level, thus avoiding overload of wind turbine generator components.

12 Claims, 2 Drawing Sheets

(56) References Cited

OTHER PUBLICATIONS

Hansen et al., "Control of variable speed wind turbines with doubly-fed induction generators", Wind Engineering vol. 28, No. 4, 2004, pp. 411-434.

Steinbuch et al., "Optimal Control of Wind Power Plants", Journal of Wind Engineering and Industrial Aerodynamics, 27 (1988) 237-246, Elsevier Science Publishers B.V., Amsterdam.

European Patent Office, International Search Report issued in related International Application No. PCT/IB2009/052951 dated Dec. 30, 2009.

* cited by examiner

METHOD OF CONTROLLING A VARIABLE SPEED WIND TURBINE

TECHNICAL FIELD

The present invention relates to a method of controlling a variable speed wind turbine of the kind set forth in the preamble of claim 1.

BACKGROUND ART

In wind turbine systems with variable rotational speed it is known to use a back-to-back converter for transferring electrical energy between the rotor of the double-fed induction generator and the grid. The back-to-back converter comprises a rotor-connected converter, an intermediate DC circuit and a grid-connected converter. The back-to-back converter can be controlled in such a way that the stator windings of the generator can be connected directly to the grid due to the fact that the currents in the rotor windings are controlled in such a way that the frequency of the stator windings corresponds to the grid frequency. Furthermore, the current in the rotor windings is controlled in such a way that desired values of active and reactive power delivered by the generator can be obtained. Such wind turbine systems are e.g. known from U.S. Pat. No. 5,083,039.

In an alternative, the back-to-back converter can be substituted by a so-called matrix converter, said matrix converter corresponding more or less to the back-to-back converter except for not requiring the intermediate DC circuit.

The normal control of such a wind turbine is performed in order to optimize the generated power, said optimization normally being performed by controlling the speed of the wind turbine generator in dependence of the measured wind speed. During such control the electrical power in the generator rotor windings will vary dependent on the rotational speed and other parameters of the wind turbine system. Under certain circumstances relatively high electrical power is present in the rotor windings, and possibly the windings and the electronic components of the converter connected between the rotor windings and the power grid are not dimensioned to the relatively high power to be transferred, and in this connection, possible protective circuits may disconnect the wind turbine from the power grid.

DISCLOSURE OF THE INVENTION

It is the object of the present invention to provide a method of controlling a variable speed wind turbine comprising a double-fed synchronous generator, said method providing the possibility of maintaining the connection between the wind turbine generator and the power grid during such situations, in which the active electrical power in the rotor windings would normally exceed the power to which the rotor winding circuitry has been dimensioned. This object is achieved with a method which according to the present invention comprises the features said forth in claim 1. With this arrangement, the wind turbine generator can be controlled in such a way that the active electrical power in the rotor is kept below predetermined dimensioning limits.

BRIEF DESCRIPTION OF THE DRAWINGS

In the following detailed part of the present description, the invention will be explained in more detail with reference to the exemplary embodiments of a method in accordance with the invention schematically indicated in the drawings, in which FIG. 1 schematically shows the rotor power as a function of time for a wind turbine generator in which the present invention has been implemented and has not been implemented, respectively, and shows a suggested rotor active power limit, which the rotor active power should be limited to by implementation of the present invention, FIG. 2 schematically shows a preferred embodiment of a PID controller for controlling the wind turbine, said PID controller using the rotor power $P_r$ and the reference for the rotor power $P_r$Ref as input parameters in order to provide a correction for adding to the speed reference RPMRef for the control process which is indicated as a black box containing the turbine having the corrected RPMRef as input and the rotor power as output.

DESCRIPTION OF A PREFERRED EMBODIMENT

Figure 1:
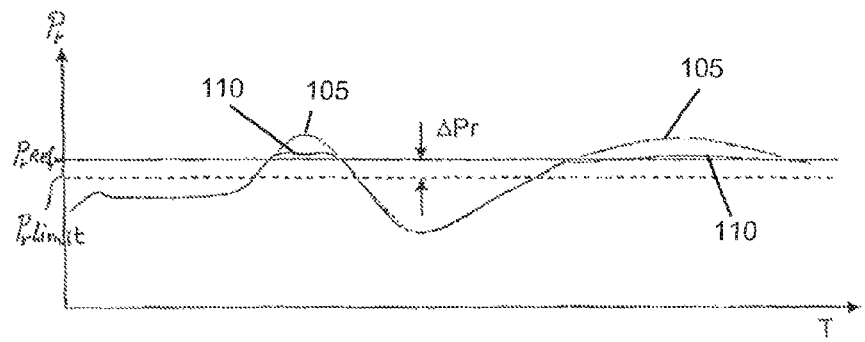

When the present invention has not been implemented, the rotor active power $P_r$ may, as shown in FIG. 1, fluctuate and have peaks greatly exceeding the indicated suggested rotor active power reference $P_r$Ref for the electrical power in the rotor as shown by line 105, and the dimensioning of the components of the electrical circuitry connected to the rotor windings should either be dimensioned to the maximum values of this rotor power or the rotor active power should be controlled in order to be able to dimension the components to a lower value. With the present invention implemented, FIG. 1 shows that the rotor active power is controlled to be maintained at values below or only insignificantly exceeding the indicated rotor power reference $P_r$Ref as shown by line 110.

There are primarily two situations that lead to high rotor circuit power and subsequent activation of the rotor power limiter in accordance with the present invention. When the wind turbine is controlled for optimizing the power generation based on measurement of the wind speed, the measured wind speed used for controlling the generator speed, when the wind turbine operates under partial load, may deviate from the actual wind speed. When thus the measured wind speed is too low compared to the actual wind speed, the resulting speed reference for controlling the speed of the generator will be too low compared to the desired speed. In this situation, the rotor active power limiter in accordance with the present invention may increase the generator speed, which will bring the speed closer to the optimal speed, thus reducing the rotor active power and maintaining the optimum power production. Furthermore, when the air density is very high, e.g. during extreme low ambient temperature conditions, the control based on measurement of the wind speed will lead to increased rotor circuit power. Also in this situation the rotor active power limiter in accordance with the present invention will increase the generator speed, whereby the rotor circuit active power will be reduced as desired.

Figure 2:
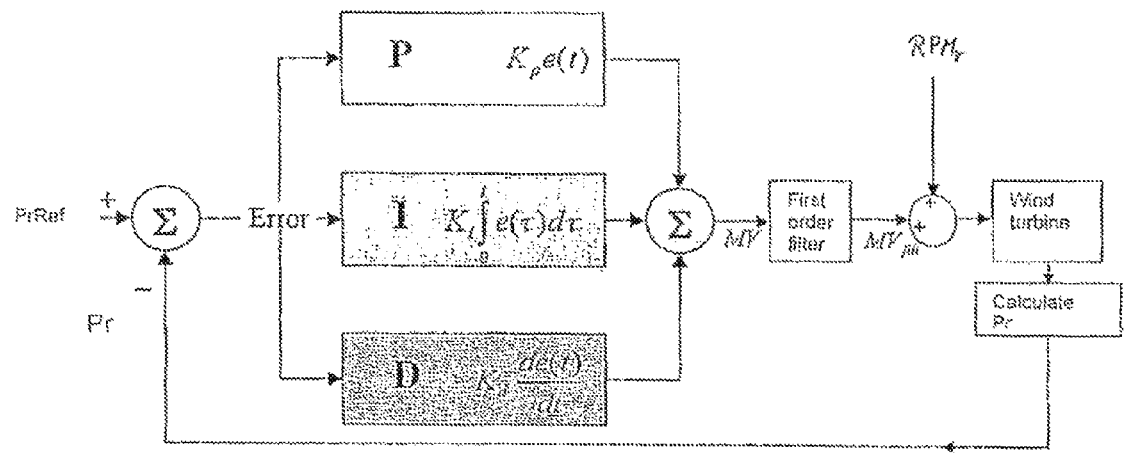

In the preferred embodiment, the control algorithm schematically indicated in FIG. 2 is only activated whenever the rotor active power limit $P_r$Limit is exceeded, and in all other situations the control of the wind turbine system is performed in order to optimize the generated power, as is well known in the prior art.

When the control system in FIG. 2 is activated, this system provides a correction to the RPM reference in order to control the rotor power of the generator. As shown in FIG. 2, a pre-defined rotor power reference $P_r$Ref is used to calculate the rotor power error for the PID controller by subtracting the measured or calculated rotor power $P_r$ from the pre-defined rotor power reference $P_r$Ref. As is well-known, this error is used as input for a P, I and D calculation circuitry and summarized for providing a RPM reference correction MV as an output from the PID controller. The different constants of the P, I and D circuitries are chosen in order to obtain a stable and well-functioning control of the rotor power. In order to start the controller up in the right position, the errors are set to zero whenever the electrical rotor power is below the rotor power limit $P_r$Limit and the wind turbine system is controlled by the normal control system. Furthermore, the output from the PID controller, i.e. MV, is set equal to zero.

As shown in FIG. 2, the output MV from the PID controller may be subjected to a first order filtering before being used for correcting the RPM reference. This filtering is optional and may be necessary in order to provide stability for the control system.

The function of the controller is to limit the rotor power in order to prevent the turbine from stopping due to excessive rotor power. Three different stages can be defined for the controller, i.e. the controller activated to limit power, the controller deactivated, and finally initialization.

The power-limiting function is activated whenever the rotor power is higher than the preset rotor power limit $P_r$Limit. In this situation, the controller is activated and the generator speed reference is corrected using the PID controller providing a correction value MV, which is a function of the error in the electrical rotor power, $$MV_n = MV_{n-1} + \left(K_p + hK_i + \frac{K_d}{h}\right)e_n - \left(K_p + 2\frac{K_d}{h}\right)e_{n-1} + \frac{K_d}{h}e_{n-2}.$$

MV is the control output added to the RPM reference. This control output MV is added to the output RPM, from the ordinary controller, which bases its control on e.g. measurement of the wind speed.

MV_n−1 is the previous control output added to the RPM reference.

h is the step size.

e_n=PrRef−Pr.

e_n−1 is the previous error.

e_n−2 is the error before the previous error.

The electrical rotor power may be calculated using the following equation.

$$P_r = P \cdot \frac{s}{1+s},$$

where P is the electrical active power of the turbine and the slip, s, is calculated by $$s = \frac{\Omega - 1800}{1800},$$

where $\Omega$ is the actual generator speed measured in rpm, and 1800 is the synchronous speed of the generator (in rpm) which is the synchronous speed of a 4 pole 60 Hz generator.

Naturally, the slip s for other types of generators having other numbers of poles and working at other frequencies will need other figures in said formula.

Before calculating the correction signal MV for the RPM reference, the errors are set equal to e_n−2=e_n−1
 e_n−1=e_n
 e_n=PrRef−Pr During periods in which the electrical rotor power is below the rotor power limit $P_r$Limit, the control is deactivated and the generator RPM is controlled by the normal system, typically using the wind speed as input for a controller for calculating the optimum value of the generator speed. During such times, the errors of the controller is set to zero, and in order to start up at the right point for MV_n−1, this is set equal to the zero.

The initialisation of the algorithm is thus performed by setting e_n=e_n−1=e_n−2=0 and setting MV=MV_n−1=0.

Although above the invention has been explained in connection with a PID controller, a person skilled in the art will realize that the invention may be implemented using a P or a PI controller as well. Furthermore, it is obvious that the rotor power may be limited by limiting the active power of the generator, e.g. implementing a correction of a power reference for the generator active power using the equation $$P_r = P \cdot \frac{s}{1+s},$$

which indicates that the rotor active power $P_r$ can be limited by limiting the generator active power P, indirectly by varying the speed of the turbine.

The following algorithm is implemented using estimation of the rotor active power $P_r$ according to $$P_r = P \cdot \frac{s}{1+s}.$$

Here, total turbine active power P is known to the central controller through measured turbine line current, voltage and power factor.

i.e. P=$\sqrt{3}$·$U_L$·$I_L$·(P.F), where $U_L$-turbine line voltage, $I_L$-turbine line current, P.F-power factor.

Alternatively, rotor active power, $P_r$, can be directly measured on the rotor converter with already measured rotor voltage and current signals using the above formula. This method will eliminate possible inaccuracies introduced by the speed measurement used to calculate the slip in the previous method.

Figure 3:
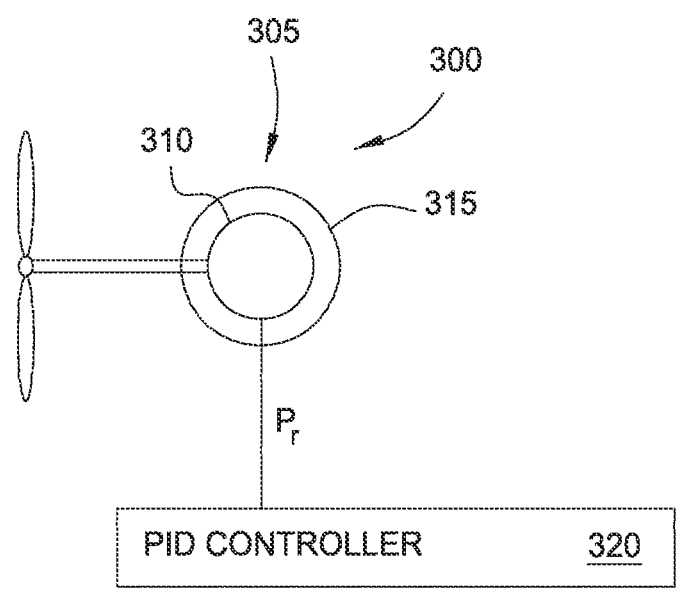
FIG. 3 illustrates a wind turbine, according to one embodiment described herein.

FIG. 3 illustrates a wind turbine 300 that includes a generator 305 (e.g., a double-fed asynchronous generator) having rotor windings 310 and stator windings 315. The turbine 300 also includes a PID controller 320 that uses the electrical power in the rotor windings 310 and a preset limit as input parameters for correcting the speed reference for a wind turbine controller.

The invention claimed is:

1. A method of controlling a variable speed wind turbine comprising a double-fed asynchronous generator having rotor windings and stator windings, said method comprising:
  measuring or calculating, based on measured parameters, the active electrical power in the rotor windings,
  comparing the active electrical power in the rotor windings with a preset limit, and
  when the active electrical power in the rotor windings exceeds the preset limit, controlling the generator speed to minimize the difference between the active electrical power in the rotor windings and a preset reference thereby maintaining the active electrical power approximately equal to or below the preset reference, wherein the preset reference is a recommended power value for the rotor windings and the preset limit is a predefined value less than the preset reference.

2. The method of claim 1, wherein the control of the generator speed to minimize the difference between the active electrical power in the rotor windings and the preset limit is performed by a PID controller, the PID controller using the electrical power in the rotor windings and the preset limit as input parameters and an output of the PID controller is a correction value for setting the generator speed.

3. The method of claim 2, wherein the active electrical power in the rotor windings is calculated based on measurements of the active turbine power P and the slip s, using the equation $P_r = P \cdot s/1+s$.

4. The method of claim 1, wherein the active electrical power in the rotor windings is calculated based on measurements of voltages and currents of the rotor windings.

5. The method of claim 1, wherein the active electrical power in the rotor windings is calculated based on measurements of the active turbine power P and the slip s, using the equation $P_r = P \cdot s/1+s$.

6. The method of claim 1, wherein the generator speed is controlled to optimize the generated power.

7. The method of claim 1, wherein controlling the generator speed comprises:

calculating, using a PID controller, a correction value based on the difference between the active electrical power and the preset reference; and combining the correction value with a generator speed value outputted by a wind turbine controller to yield a corrected generator speed value used to set the speed of the generator.

8. The method of claim 7, further comprising:

when the active electrical power in the rotor windings is less than the preset limit, controlling the speed of the generator using the output of the wind turbine controller but not the correction value of the PID controller.

9. The method of claim 7, wherein the control of the generator speed to minimize the difference between the active electrical power in the rotor windings and the preset limit is performed by the PID controller, the PID controller using the electrical power in the rotor windings and the preset limit as input parameters and an output of the PID controller is a correction value for setting the generator speed.

10. The method of claim 9, wherein the active electrical power in the rotor windings is calculated based on measurements of voltages and currents of the rotor windings.

11. The method of claim 7, wherein the active electrical power in the rotor windings is calculated based on measurements of voltages and currents of the rotor windings.

12. The method of claim 7, wherein the active electrical power in the rotor windings is calculated based on measurements of the active turbine power P and the slip s, using the equation $P_r = P \cdot s/1+s$.

* * * * *